United States Patent [19]

Biller

[11] Patent Number: 4,487,454
[45] Date of Patent: Dec. 11, 1984

[54] ANCHORAGE FOR THE BELT LATCH OF A SAFETY BELT

[75] Inventor: Dieter Biller, Mutlangen, Fed. Rep. of Germany

[73] Assignee: REPA Feinstanzwerk, GmbH, Alfdorf, Fed. Rep. of Germany

[21] Appl. No.: 489,455

[22] Filed: Apr. 28, 1983

[30] Foreign Application Priority Data

Apr. 29, 1982 [DE] Fed. Rep. of Germany ....... 3216015

[51] Int. Cl.³ ...................... B60R 21/00; A47D 15/00
[52] U.S. Cl. .................................... 297/468; 248/420; 280/804; 297/479; 297/480
[58] Field of Search ............... 297/472, 480, 468, 479, 297/473, 476; 280/804; 248/393, 419, 420

[56] References Cited

U.S. PATENT DOCUMENTS

| | | | |
|---|---|---|---|
| 3,207,554 | 9/1965 | Dall | 248/429 X |
| 3,649,076 | 3/1972 | Blake | 297/479 |
| 4,072,347 | 2/1978 | Boisset | 248/429 X |
| 4,200,308 | 4/1980 | Irwin | 297/480 |
| 4,229,041 | 10/1980 | Werner | 297/468 |
| 4,248,480 | 2/1981 | Koucky | 297/473 |
| 4,262,963 | 4/1981 | Bauer et al. | 248/429 X |
| 4,313,246 | 2/1982 | Fohl | 297/468 X |

FOREIGN PATENT DOCUMENTS 48001 1/1980 Japan ................................... 297/473

Primary Examiner—James T. McCall
Attorney, Agent, or Firm—Yount & Tarolli

[57] ABSTRACT

Anchorage for the belt latch of a safety belt arranged in vehicles, especially motor vehicles, with a lock fitting which is connected to the height-adjustable seat. A frame fitting, relative to which the lock fitting can slide in a guide. A locking part for connecting the above-mentioned fittings upon the action of a pulling force cancels the holding force of a connecting element on the belt. The locking part designed as a rocking lever is pivoted on the one side at the height-adjustable seat and on the other side at the lock fitting. The locking part has a detent serration which in normal operation is held by the connecting element (shearing pin) at a distance from a detent element of the frame fitting and is swung, after the holding force is overcome, and is detented by the detent element forming a lock.

9 Claims, 4 Drawing Figures

4,487,454

ANCHORAGE FOR THE BELT LATCH OF A SAFETY BELT

BACKGROUND OF THE INVENTION

1. Field of the Invention

This invention relates to anchorage for the belt latch of a safety belt arranged in vehicles, especially motor vehicles, with a lock fitting which is connected to the height-adjustable seat.

2. Description of the Prior Art

In one known anchorage for the belt latch of a safety belt of the above-mentioned type (German Published Non-Prosecuted Application DE-OS 28 00 261), a lock fitting for the belt latch having locking means is connected via a rivet which can be sheared off in the event of a crash to a sleeve-like guide member which is fastened to the adjustable seat frame, in which a serrated strap which can be locked by the locking means of the lock fitting, is guided with a sliding fit in the pull direction of the belt. This serrated strap is in detentable, sliding connection with a locking bar which is arranged fixed at the vehicle body. In the event of a crash, the rivet is sheared off, whereupon a large acceleration force acts on the lock fitting. In this process, the lock fitting is blocked by inclined thrust surfaces with locking teeth in a serration of the serrated strap. Due to the stress or the serrated strap, a holding claw in turn is bent up within a longitudinal guide clamp, whereby locking teeth of the serrated strap are detented in the serrations of the locking bar. This known anchorage is of an elaborate design due to the multiplicity of parts mutually influencing each other and is accordingly expensive. Because of the more complicated mechanical design, there is also the danger that in an emergency the one or the other functional element might fail and immediate and automatic locking not take place.

SUMMARY OF THE INVENTION

An object of the invention is to provide an anchorage for the belt latch of a safety belt in a vehicle, with a lock fitting connected to the height-adjustable seat which is of simple mechanical design and has good operational safety.

With the foregoing and other objects in view, there is provided in accordance with the invention an anchorage for a belt latch of a safety belt in a vehicle with a height-adjustable seat comprising a lock fitting having one end connected to the belt latch and the other end connected to the height-adjustable seat, a frame fitting relative to which the lock fitting can slide in a guide, a locking part for connecting and locking the lock fitting and the frame fitting upon the application of a strong pulling force on the lock fitting during abnormal operation, a connecting element preventing the locking part from connecting the lock fitting and the frame fitting during normal operation, said locking part in the form of a rocking lever pivoted on one side to the height-adjustable seat and on the other side to the lock fitting, said locking part also having a detent serration adapted upon said application of a strong pulling force to engage a detent element attached to the frame fitting, said connecting element in the form of a shearing pin in normal operation holds the detent serration a distance from the detent element.

Other features which are considered as characteristic for the invention are set forth in the appended claims.

Although the invention is illustrated and described herein as embodied in an anchorage for the belt latch of a safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
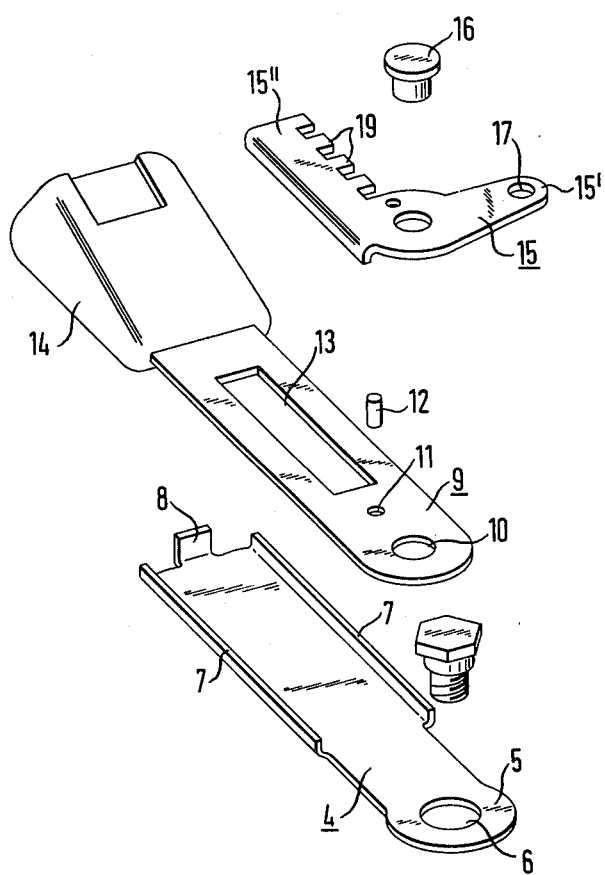
FIG. 1 shows an exploded view of the anchorage according to the invention.

In accordance with the invention, the anchorage for the belt latch of a safety belt arranged in vehicles has a lock fitting connected to the height adjustable seat, a frame fitting relative to which the lock fitting can slide in a guide, and a locking part for connecting the above-mentioned fittings upon the action of a pulling force which cancels the holding force of a connecting element on the belt. The locking part designed as a rocking lever is pivoted on one side at the height-adjustable seat and on the other side at the lock fitting. The locking part has a detent serration which in normal operation is held by the connecting element (shearing pin) at a distance from a detent element of the frame fitting and is swung, after the holding force is overcome, and is detented by the detent element, forming a lock.

Through the special arrangement and design of the locking part, i.e., through its design as a rocking lever and its pivoted support at the height-adjustable seat on the one side and at the lock fitting on the other side, the serration of the frame fitting is steered-in automatically in the event of a crash, after the holding force of the connecting element, for instance, the shearing element, is overcome, in that the detent connection takes place through a defined rotary motion of the locking part designed as a rocking lever. This automatic steering-in motion takes place immediately after the above-mentioned holding force is overcome, whereupon a firm coupling of the lock fitting with the frame fitting is provided immediately. In contrast to the known device mentioned at the outset, substantially only three functional parts are required for the anchorage according to the invention, whereby a very inexpensive solution is obtained and whereby there are fewer potential trouble sources. The anchorage according to the invention is, of course, also suitable for vehicle seats which are supported in the usual manner at the vehicle frame so as to be movable lengthwise. It is ensured here that the above-mentioned detent between the lock fitting and the frame fitting takes place in any height and lengthwise position of the seat.

According to a further embodiment of the invention, an effortless sliding motion between the lock fitting and the frame fitting without tilt is assured because one of the fittings, preferably the frame fitting, is of U-shaped or box-shaped design and forms a sliding guide for the other fitting, preferably the lock fitting.

Further advantageous details of the invention may be seen from the embodiment example which is shown in the drawings and will be described in the following.

Figure 2:
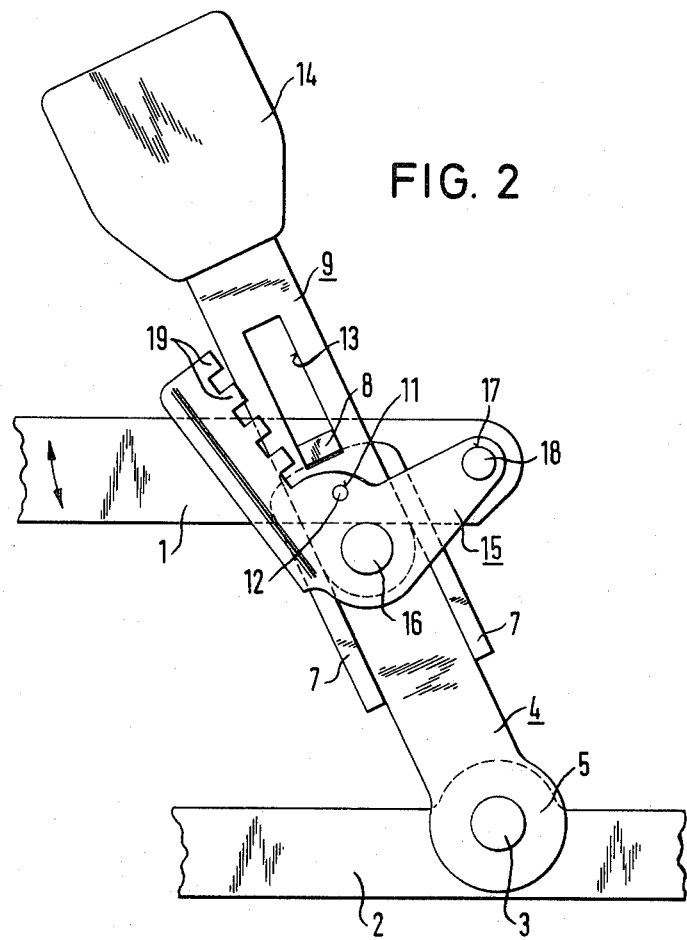
FIGS. 2 and 3 show an anchorage according to FIG. 1 built into a vehicle in a side view and in two different height adjustments, in the normal operating position.
Figure 3:
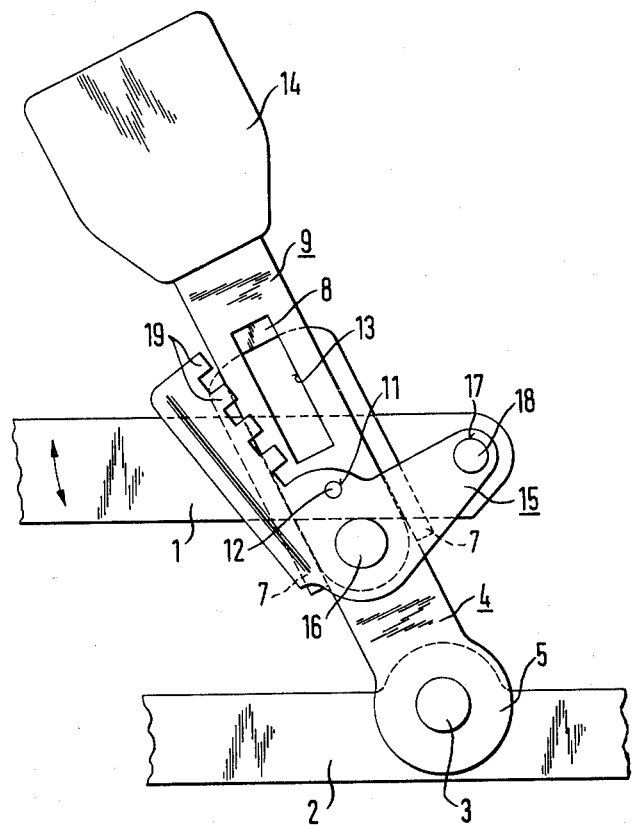
Figure 4:
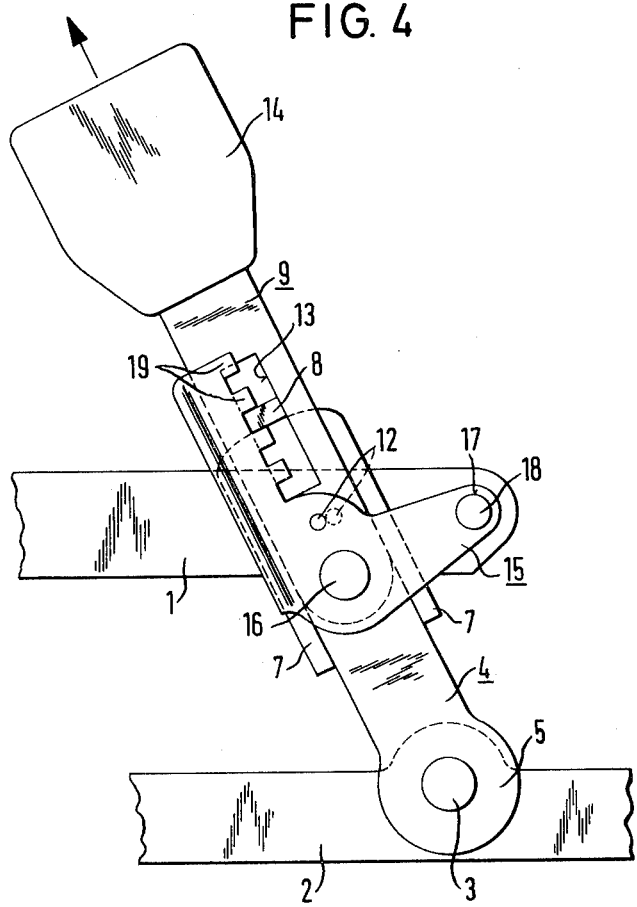
FIG. 4 shows the anchorage according to the preceding figures in the detented position after a crash.

In the embodiment example according to FIGS. 2 to 4, a seat is mounted in a motor vehicle and connected via connecting elements, not specifically shown, to a seat track 2 which is connected to the vehicle frame, for instance, longitudinally adjustably and can be adjusted in height relative to the seat track. An elongated frame fitting 4 is pivoted at the seat track 2 in a pivot 3. As may clearly be seen especially from FIG. 1, the frame fitting 4 has, following a bearing section 5 with the bearing opening 6, a U-shaped profile with laterally bent-up edges 7. At the other end of frame fitting 4 opposite opening 6 is a detent element 8 in the form of a bent-up tab. A similar elongated substantially plane lock fitting 9 is movably guided in the sliding guide of the frame fitting 4 formed by the bent-up edges 7. Lock fitting 9 has at one end a bearing opening 10, following thereon a bearing opening 11 for a shear pin 12 and following thereon a longitudinal slot 13. The other end of lock fitting 9 is firmly connected to a belt latch 14 of conventional design. The plug-in tongue of a safety belt, not shown, can be inserted and locked into the belt latch 14 in the usual manner. A locking part 15 designed as a two-armed rocking lever is pivoted by means of a bearing rivet 16 at the lock fitting 9 and has two lever arms 15' and 15" which are substantially at right angles to each other. The free end of the lever arm 15' has a bearing opening 17 by means of which lever arm 15' is pivoted at the seat 1, for instance, by means of a bearing rivet 18. The other lever arm 15" has a detent serration 19 designed in the form of a rack. In the position for normal operation, the detent serration 19 is kept at a distance from the detent element 8 of the frame fitting 4 by the shear pin 12 passing through the blocking part 15 and the lock fitting 9, in order that adjustability in height of the seat 1 relative to the seat track 2 as well as mobility in length between the lock fitting 9 and the frame fitting 4 is provided. The detent element 8 slides in the longitudinal slot 13 of the lock fitting 9. The detent element 8 protrudes through this longitudinal slot 13 up to the height of the pivoted blocking part 15. In FIG. 2 is shown the topmost position of the seat 1 and in FIG. 3 the lowest position of the seat 1.

In the event of a crash, a pulling force is exerted on the lock fitting 9 in the direction of the arrow according to FIG. 4 via the safety belt inserted into the belt latch 14. In the process, the pivot at 18 between the blocking part 15 and the seat 1 as well as the shearing pin 12 in the opening 11 are stressed until the pin 12 is sheared off by the force of the pivoted blocking part 15. Thereby the swing motion of the blocking part 15 in the detent position, i.e. previously blocked by pin 12, as shown in FIG. 4 and the blocking part 15 with its detent serration 19 is swung about the support point at 16 and is automatically steered into the detent element 8 of the frame fitting 4. As a result of engaging detent 8 with detent serration 19, a firm coupling between the lock fitting 9 and the frame fitting 4 via the blocking part 15 in the respective height position of the seat 1 takes place.

The total pulling force transmitted by the safety belt to the anchorage is then transmitted via the locking part 15, the detent element 8 and the frame fitting 4 as well as via the pivot 3 to the seat track 2 which is connected to the motor vehicle frame or the motor vehicle floor.

It goes without saying that it is possible within the scope of the invention to provide, instead of the individual detent element 8, a rack with fine serrations which cooperates either with a single detent tooth of the locking part 15 or with another fine-toothed rack of this locking part, forming a detent.

The foregoing is a description corresponding, in substance, to German application P No. 32 16 015.1, dated Apr. 29, 1982, internatinal priority of which is being claimed for the instant application, and which is hereby made part of this application. Any material discrepancies between the foregong specification and the specification of the aforementioned corresponding German application are to be resolved in favor of the latter.

I claim:

1. Anchorage for a belt latch of a safety belt in a vehicle with a height-adjustable seat comprising a lock fitting having one end connected to the belt latch and the other end connected to the height-adjustable seat, a frame fitting relative to which the lock fitting can slide in a guide, a locking part for connecting and locking the lock fitting and the frame fitting upon the application of a strong pulling force on the lock fitting during abnormal operation, a connecting element preventing the locking part from connecting the lock fitting and the frame fitting during normal operation, said locking part in the form of a rocking lever pivoted on one side to the height-adjustable seat and on the other side to the lock fitting, said locking part also having a detent serration adapted upon said application of a strong pulling force to engage a detent element attached to the frame fitting, said connecting element in the form of a shearing pin in normal operation holds the detent serration a distance from the detent element.

2. Anchorage according to claim 1, wherein the detent serration of the locking part is in the form of a rack.

3. Anchorage according to claim 1, wherein the detent element is in the form of a rack.

4. Anchorage according to claim 1, wherein one of the fittings of the frame fitting and the lock fitting, is in U- or box-shape and forms a sliding guide for the other fitting.

5. Anchorage according to claim 1, wherein the frame fitting is in U- or box-shape and forms a sliding guide for the lock fitting.

6. Anchorage according to claim 1, wherein the lock fitting has a longitudinal slot and wherein the detent element of the frame fitting protrudes through the longitudinal slot in the lock fitting to the height of the pivoted locking part to enable the detent element to engage the detent serration during abnormal operation.

7. Anchorage according to claim 2, wherein the lock fitting has a longitudinal slot and wherein the detent element of the frame fitting protrudes through the longitudinal slot in the lock fitting to the height of the pivoted locking part to enable the detent element to engage the detent serration during abnormal operation.

8. Anchorage according to claim 3, wherein the lock fitting has a longitudinal slot and wherein the detent element of the frame fitting protrudes through the longitudinal slot in the lock fitting to the height of the pivoted locking part to enable the detent element to engage the detent serration during abnormal operation.

9. Anchorage according to claim 4, wherein the lock fitting has a longitudinal slot and wherein the detent element of the frame fitting protrudes through the longitudinal slot in the lock fitting to the height of the pivoted locking part to enable the detent element to engage the detent serration during abnormal operation.

* * * * *